US010362401B2

(12) United States Patent
Sun et al.

(10) Patent No.: US 10,362,401 B2
(45) Date of Patent: Jul. 23, 2019

(54) ORIENTATION-AWARE SURROUND SOUND PLAYBACK

(71) Applicant: Dolby Laboratories Licensing Corporation, San Francisco, CA (US)

(72) Inventors: Xuejing Sun, Beijing (CN); Guilin Ma, Beijing (CN); Xiguang Zheng, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 55 days.

(21) Appl. No.: 15/507,195

(22) PCT Filed: Aug. 27, 2015

(86) PCT No.: PCT/US2015/047256
§ 371 (c)(1),
(2) Date: Feb. 27, 2017

(87) PCT Pub. No.: WO2016/033358
PCT Pub. Date: Mar. 3, 2016

(65) Prior Publication Data

US 2017/0245055 A1 Aug. 24, 2017

Related U.S. Application Data

(60) Provisional application No. 62/069,356, filed on Oct. 28, 2014.

(30) Foreign Application Priority Data

Aug. 29, 2014 (CN) .......................... 2014 1 0448788

(51) Int. Cl.
*G06F 17/00* (2019.01)
*H04R 5/04* (2006.01)
(Continued)

(52) U.S. Cl.
CPC ............... *H04R 5/04* (2013.01); *H04S 1/002* (2013.01); *H04S 3/002* (2013.01); *H04S 3/02* (2013.01);
(Continued)

(58) Field of Classification Search
CPC .. H04R 5/04; H04R 2420/01; H04R 2420/03; H04R 2499/11; H04R 2499/15;
(Continued)

(56) References Cited

U.S. PATENT DOCUMENTS 7,526,378 B2 4/2009 Genz
8,243,961 B1 8/2012 Morrill
(Continued)

FOREIGN PATENT DOCUMENTS

CN 101553867 10/2009
CN 103583054 2/2014
(Continued)

OTHER PUBLICATIONS

McKeag, A. et al "Sound Field Format to Binaural Decoder with Head Tracking" AES Convention 6th Australian Regional Convention, Aug. 1, 1996.
(Continued)

*Primary Examiner* — Md S Elahee
*Assistant Examiner* — David Siegel
(74) *Attorney, Agent, or Firm* — Geoffrey T. Staniford; Staniford Tomita LLP

(57) ABSTRACT

Example embodiments disclosed herein relate to orientation-aware surround sound playback. A method for processing audio on an electronic device that includes a plurality of loudspeakers is disclosed, the loudspeakers arranged in more than one dimension of the electronic device. The method includes, responsive to receipt of a plurality of received audio streams, generating a rendering component
(Continued)

associated with the plurality of received audio streams, determining an orientation dependent component of the rendering component, processing the rendering component by updating the orientation dependent component according to an orientation of the loudspeakers and dispatching the received audio streams to the plurality of loudspeakers for playback based on the processed rendering component. Corresponding system and computer program products are also disclosed.

17 Claims, 3 Drawing Sheets

(51) Int. Cl.

| | |
|---|---|
| ***H04S 7/00*** | (2006.01) |
| ***H04S 1/00*** | (2006.01) |
| ***H04S 3/00*** | (2006.01) |
| ***H04S 3/02*** | (2006.01) |
| *H04S 5/00* | (2006.01) |

(52) U.S. Cl.
CPC .......... *H04S 7/302* (2013.01); *H04R 2420/01* (2013.01); *H04R 2420/03* (2013.01); *H04R 2499/11* (2013.01); *H04R 2499/15* (2013.01); *H04S 5/00* (2013.01); *H04S 2400/01* (2013.01); *H04S 2400/03* (2013.01); *H04S 2400/11* (2013.01); *H04S 2420/01* (2013.01); *H04S 2420/11* (2013.01)

(58) Field of Classification Search
CPC . H04S 1/002; H04S 3/002; H04S 3/02; H04S 7/302; H04S 5/00; H04S 2400/01; H04S 2400/03; H04S 2400/11; H04S 2420/01; H04S 2420/11
See application file for complete search history.

(56) References Cited

U.S. PATENT DOCUMENTS

| | | | | |
|---|---|---|---|---|
| 8,600,084 | B1 | 12/2013 | Garrett | |
| 2009/0238372 | A1 | 9/2009 | Hsu | |
| 2011/0002487 | A1 | 1/2011 | Panther | |
| 2011/0150247 | A1 | 6/2011 | Oliveras | |
| 2011/0316768 | A1 | 12/2011 | McRae | |
| 2012/0015697 | A1 | 1/2012 | Spencer | |
| 2012/0051567 | A1 | 3/2012 | Castor-Perry | |
| 2013/0028446 | A1 | 1/2013 | Krzyzanowski | |
| 2013/0038726 | A1 | 2/2013 | Kim | |
| 2013/0129122 | A1 | 5/2013 | Johnson | |
| 2013/0156203 | A1 | 6/2013 | Choi | |
| 2013/0163794 | A1 | 6/2013 | Groves | |
| 2013/0279706 | A1 | 10/2013 | Martin | |
| 2014/0044286 | A1 | 2/2014 | Coles | |
| 2014/0270184 | A1* | 9/2014 | Beaton | H04S 7/307 381/17 |
| 2014/0314239 | A1* | 10/2014 | Meyer | G06F 3/165 381/58 |
| 2015/0248891 | A1* | 9/2015 | Adami | H04S 5/00 381/303 |

FOREIGN PATENT DOCUMENTS

| | | |
|---|---|---|
| JP | H07-046700 | 2/1995 |
| JP | 20080160265 | 7/2010 |
| TW | 201426738 | 7/2014 |
| WO | 2013/142657 | 9/2013 |
| WO | 2013/186593 | 12/2013 |
| WO | 2014/036121 | 3/2014 |

OTHER PUBLICATIONS

Pulkki, Ville "Spatial Sound Reproduction with Directional Audio Coding" J. Audio Engineering Society, Jun. 1, 2007, pp. 503-516.
http://web.uvic.ca/~adambard/ASP/project/ (visited Apr. 29, 2014).
Breebaart, J. et al "Binaural Rendering in MPEG Surround" EURASIP Journal on Advances in Signal Processing, vol. 2008, 14 pages, Hindawi Publishing Corporation.
Wang, L. et al "A Stereo Crosstalk Cancellation System Based on the Common-Acoustical Pole/Zero Model" Hindawi Publishing Corporation, EURASIP Journal on Advances in Signal Processing, vol. 2010, 11 pages, 2010.

* cited by examiner

ORIENTATION-AWARE SURROUND SOUND PLAYBACK

CROSS REFERENCE TO RELATED APPLICATIONS

This application claims priority to Chinese Patent Application No. 201410448788.2, filed on Aug. 29, 2014 and U.S. Provisional Patent Application No. 62/069,356, filed on Oct. 28, 2014, each of which is hereby incorporated by reference in its entirety.

TECHNOLOGY

Example embodiments disclosed herein generally relate to audio processing, and more specifically, to a method and system for orientation-aware surround sound playback.

BACKGROUND

Electronic devices, such as smartphones, tablets, televisions and the like are becoming increasingly ubiquitous as they are increasingly used to support various multimedia platforms (e.g., movies, music, gaming and the like). In order to better support various multimedia platforms, the multimedia industry has attempted to deliver surround sound through the loudspeakers on electronic devices. That is, many portable devices such as tablets and phones include multiple speakers to help provide stereo or surround sound. However, when surround sound is engaged, the experience degrades quickly as soon as a user changes the orientation of the device. Some of these electronic devices have attempted to provide some form of sound compensation (e.g., shifting of left and right sound, or adjustment of sound levels to the speakers) when the orientation of the device is changed.

However, it is desirable to provide a more effective solution to address the problems associated with the change of orientation of electronic devices.

SUMMARY

In order to address the foregoing and other potential problems, the example embodiments disclosed herein provide a method and system for processing audio on an electronic device which include a plurality of loudspeakers.

In one aspect, example embodiments provide a method for processing audio on an electronic device that include a plurality of loudspeakers, where the loudspeakers are arranged in more than one dimension of the electronic device. The method includes responsive to receipt of a plurality of received audio streams, generating a rendering component associated with the plurality of received audio streams, determining an orientation dependent component of the rendering component, processing the rendering component by updating the orientation dependent component according to an orientation of the loudspeakers and dispatching the received audio streams to the plurality of loudspeakers for playback based on the processed rendering component. Embodiments in this regard further include a corresponding computer program product.

In another aspect, example embodiments provide a system for processing audio on an electronic device that include a plurality of loudspeakers, where the loudspeakers are arranged in more than one dimension of the electronic device. The system includes a generator that generates a rendering component associated with a plurality of received audio streams, responsive to receipt of the plurality of received audio streams, a determinator that determines an orientation dependent component of the rendering component, a processor that process the rendering component by updating the orientation dependent component according to an orientation of the loudspeakers and a dispatcher that dispatch the received audio streams to the plurality of loudspeakers for playback based on the processed rendering component.

Through the following description, it would be appreciated that in accordance with example embodiments disclosed herein, the surround sound will be presented with high fidelity. Other advantages achieved by example embodiments will become apparent through the following descriptions.

DESCRIPTION OF DRAWINGS

Through the following detailed description with reference to the accompanying drawings, the above and other objectives, features and advantages of example embodiments will become more comprehensible. In the drawings, several embodiments will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
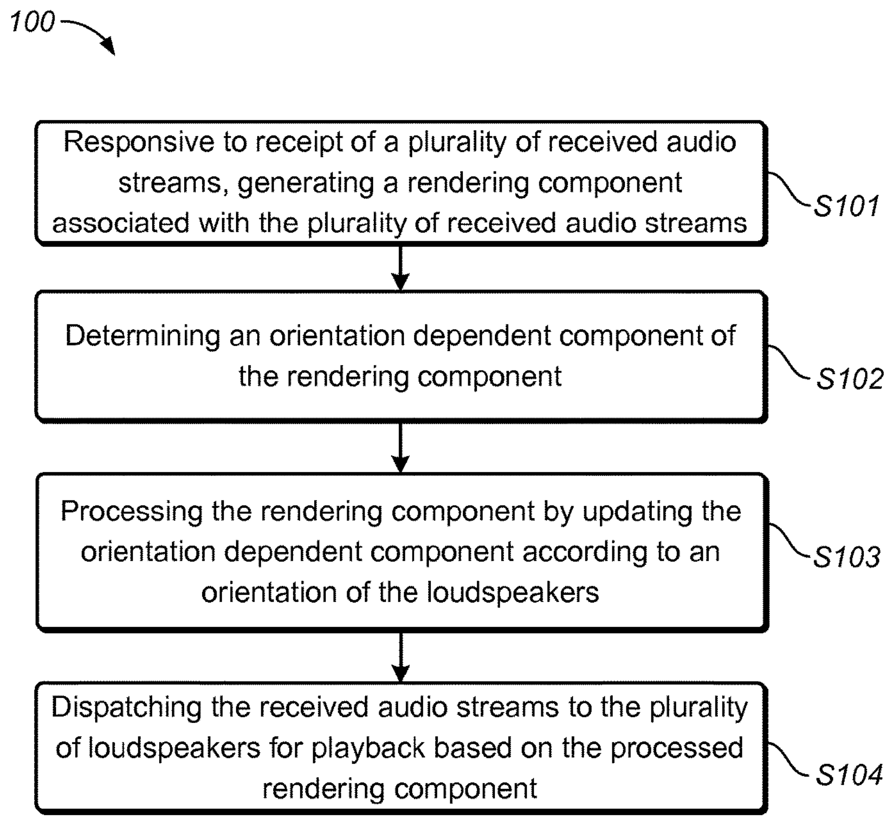
FIG. 1 illustrates a flowchart of a method for processing audio on an electronic device that includes a plurality of loudspeakers in accordance with an example embodiment.

Principles of the example embodiments will now be described with reference to various example embodiments illustrated in the drawings. It should be appreciated that the depiction of these embodiments is only to enable those skilled in the art to better understand and further implement the example embodiments, and is not intended to limit the scope of the present invention in any manner.

Referring to FIG. 1 a flowchart is illustrated showing a method 100 for processing audio on an electronic device that includes a plurality of loudspeakers in accordance with example embodiment disclosed herein.

At S101, a rendering component associated with a plurality of received audio streams is generated that is responsive to receiving a plurality of audio streams. The input audio streams can be in various formats. For example, in one example embodiment, the input audio content may conform to stereo, surround 5.1, surround 7.1, or the like. In some example embodiments, the audio content may be represented as a frequency domain signal. Alternatively, in another example embodiment, the audio content may be input as a time domain signal.

Given an array of S speakers (S>2), and one of more sound sources, $Sig_1, Sig_2, \ldots, Sig_M$, the rendering matrix R can be defined according to the equation below:

$$\begin{pmatrix} Spkr_1 \\ Spkr_2 \\ \vdots \\ Spkr_S \end{pmatrix} = \begin{pmatrix} r_{1,1} & r_{1,2} & \cdots & r_{1,M} \\ r_{2,1} & r_{2,2} & \cdots & r_{2,M} \\ \vdots & \vdots & \ddots & \vdots \\ r_{S,1} & r_{S,2} & \cdots & r_{S,M} \end{pmatrix} \times \begin{pmatrix} Sig_1 \\ Sig_2 \\ \vdots \\ Sig_M \end{pmatrix} \quad (1)$$

where $Spkr_i$ (i=1 . . . S) represents the matrix of loudspeakers, $r_{i,j}$ (i=1 . . . S, j=1 . . . M) which represents the element in the rendering component, and $Sig_i$ (i=1 . . . M) represents the matrix of audio signals.

Equation (1) can be written as in shorthand notation as follows:

$$Spkr = R \times Sig \quad (2)$$

where R represents the rendering component associated with the received audio signal.

The rendering component R can be thought of as the product of a series of separate matrix operations depending on input signal properties and playback requirements, wherein the input signal properties include the format and content of the input signal. The elements of the rendering component R may be complex variables that are a function of frequency. In this event, the accuracy can be increased by referring to $r_{i,j}(\omega)$ instead of $r_{i,j}$ as shown in equation (1).

The symbol $Sig_1, Sig_2, \ldots, Sig_M$ can represent the corresponding audio channel or the corresponding audio object respectively. For example, when the input signal is two-channel audio input signal, $Sig_1$ indicates the left channel and $Sig_2$ indicates the right channel, and when the input signal is in object audio format, $Sig_1, Sig_2, \ldots, Sig_M$ can indicate the corresponding audio objects which refer to individual audio elements that exist for a defined duration of time in the sound field.

At S102, the orientation dependent component of the rendering component R is determined. In one embodiment, the orientation of the loudspeakers is associated with an angle between the electronic device and its user.

In some embodiments, the orientation dependent component can be decoupled from the rendering component. That is, the rendering component can be split into an orientation dependent component and an orientation independent component. The orientation dependent component can be unified into the following framework.

$$O_{s,m} = \begin{pmatrix} O_{1,1} & \cdots & O_{1,m} \\ \vdots & \ddots & \vdots \\ O_{s,1} & \cdots & O_{s,m} \end{pmatrix} \quad (3)$$

where $O_{s,m}$ represents the orientation dependent component.

In one example, the rendering matrix R can be split into a default orientation invariant panning matrix P and an orientation dependent compensation matrix O as set forth below:

$$R = O \times P \quad (4)$$

where P represents the orientation independent component, and O represents the orientation dependent component.

When the electronic device is in different orientations, the Equation (4) can be written with different components, such as $R=O_L \times P$ or $R=O_P \times P$, where $O_L$ and $O_P$ represent the orientation dependent rendering matrix in landscape and portrait modes respectively.

Furthermore, the orientation dependent compensation matrix O is not limited to these two orientations, and it can be a function of the continuous device orientation in a three dimensional space. Equation (4) can be written as set forth below:

$$R(\theta) = O(\theta) \times P \quad (5)$$

where θ represents the angle between the electronic device and its user.

The decomposition of the rendering matrix can be further extended to allow additive components as set forth below:

$$R(\theta) = \sum_{i=0}^{N-1} O_i(\theta) \times P_i \quad (6)$$

where $O_i(\theta)$ and $P_i$ represent the orientation dependent matrix and the corresponding orientation independent matrix respectively, there can be N groups of such matrix.

For example, the input signals may be subject to direct and diffuse decomposition via a PCA (Principal Component Analysis) based approach. In such an approach, eigen-analysis of the covariance matrix of the multi-channel input yields a rotation matrix V, and principal components E are calculated by rotating the original input using V.

$$E = V \times Sig \quad (7)$$

where Sig represents the input signals, $Sig=[Sig_1\ Sig_2 \ldots Sig_M]^T$. V represents the rotation matrix, $V=[V_1\ V_2 \ldots V_N]$, N≤M, and each column of V is a M dimension eigen vector. E represents the principal components $E_1\ E_2 \ldots E_N$, denoted by $E=[E_1\ E_2 \ldots E_N]^T$, where N≤M.

And the direct and diffuse signals are obtained by applying appropriate gains G on E $$Sig'_{direct} = G \times E \quad (8)$$

$$Sig'_{diffuse} = (1-G) \times E \quad (9)$$

where G represents the gains.

Finally, different orientation compensations are used for the direct and diffuse parts, respectively.

$$R(\theta) = O_{direct}(\theta) \times G \times V + O_{diffuse}(\theta) \times (1-G) \times V \quad (10)$$

At step S103, the rendering component is processed by updating the orientation dependent component according to an orientation of the loudspeakers.

Figure 2:
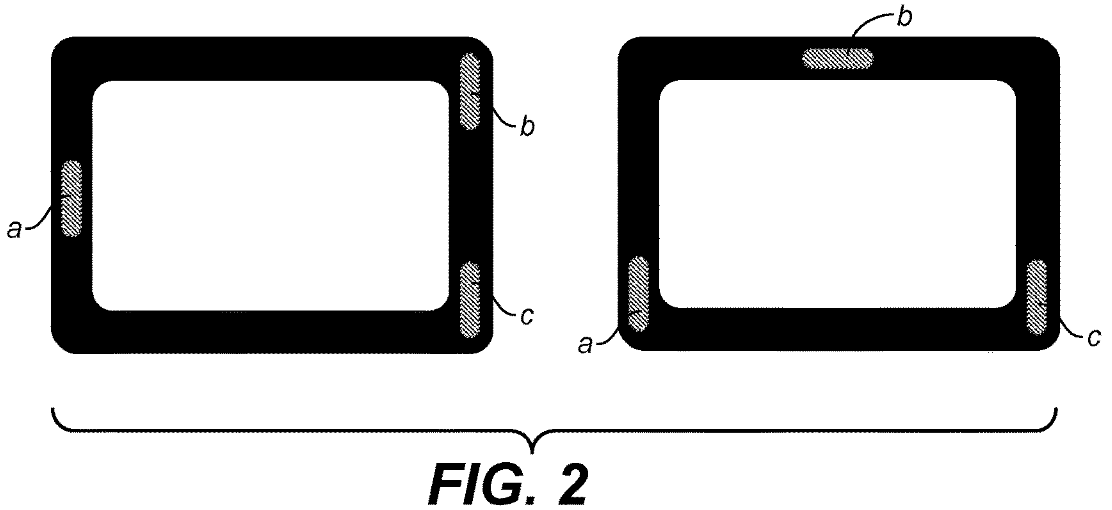
FIG. 2 illustrates two examples of three-loudspeaker layout in accordance with an example embodiment.
Figure 3:
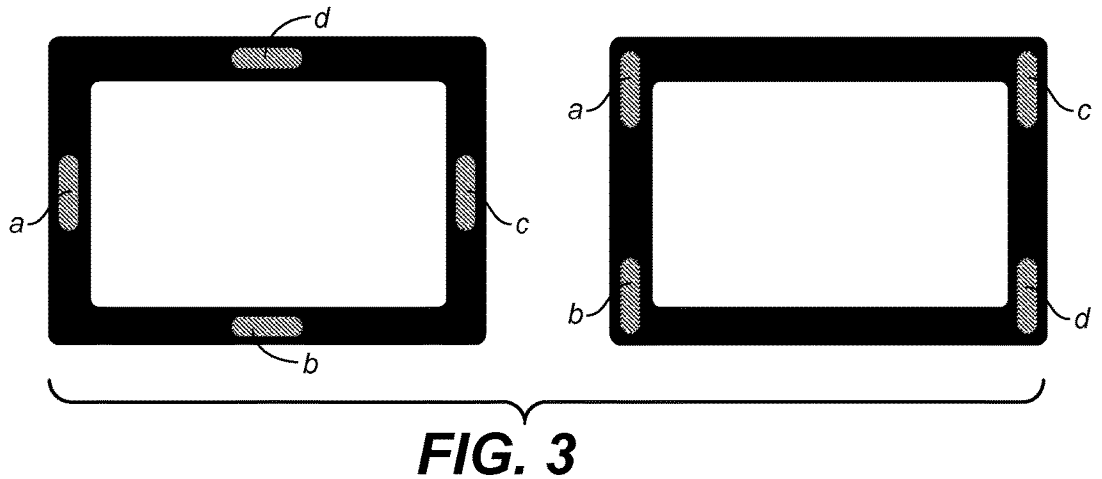
FIG. 3 illustrates two examples of block diagram of 4-loudspeaker layout in accordance with an example embodiment.

As mentioned above, electronic device may include a plurality of loudspeakers arranged in more than one dimension of the electronic device. That is to say, in one plane, the number of lines which pass through at least two loudspeakers is more than one. In some example embodiments, there are at least three or more loudspeakers or less than three loudspeakers. FIGS. 2 and 3 illustrate some non-limiting examples of three-loudspeaker layout and 4-loudspeaker layout in accordance with example embodiments, respectively. In other example embodiments, the number of the loudspeakers and the layout of the loudspeakers may vary according to different applications.

Increasingly, electronic devices (which can be rotated) are capable of determining their orientation. The orientation can be, for example, determined by using orientation sensors or other suitable modules, such as for example, gyroscope and accelerometer. The orientation determining modules can be disposed inside or external to the electronic devices. The detailed implementations of orientation determination are well known in the art and will not be explained in this disclosure in order to avoid obscuring the invention.

For example, when the orientation of the electronic device changes from 0 degree to 90 degree, the orientation dependent component will change from $O_L$ to $O_P$ correspondingly.

In some embodiments, the orientation dependent component may be determined in the rendering component, rather than decoupled from the rendering component. Correspondingly, the orientation dependent component and thus the rendering component can be updated based on the orientation.

The method 100 then proceeds to S104, where the audio streams are dispatched to the plurality of loudspeakers based on the processed rendering component.

A sensible mapping between the audio inputs and the loudspeakers is critical in delivering expected audio experience. Normally, multi-channel or binaural audios convey spatial information by assuming a particular physical loudspeaker setup. For example, a minimum L-R loudspeaker setup is required for rendering binaural audio signals. Commonly used surround 5.1 format uses five loudspeakers for center, left, right, left surround, and right surround channels. Other audio formats may include channels for overhead loudspeakers, which are used for rendering audio signals with height/elevation information, such as rain, thunders, and the like. In this step, the mapping between the audio inputs and the loudspeakers should vary according to the orientation of the device.

In some embodiment, input audio signals may be downmixed or upmixed depending on the loudspeaker layout. For example, surround 5.1 signals may be downmixed to two channels for playing on portable devices with only two loudspeakers. On the other hand, if a device has four loudspeakers, it is possible to create left and right channels plus two height channels through downmixing/upmixing operations according to the number of inputs.

With respect to the upmixing embodiments, the upmixing algorithms employ the decomposition of audio signals into diffuse and direct parts via methods such as principal component analysis (PCA). The diffuse part contributes to the general impression of spaciousness and the direct signal corresponds to point sources. The solutions to the optimization/maintaining of listening experience could be different for these two parts. The width/extent of a sound field strongly depends on the inter-channel correlation. The change in the loudspeaker layout will change the effective inter-aural correlation at the eardrums. Therefore the purpose of orientation compensation is to maintain the appropriate correlation. One way to address this problem is to introduce layout dependent decorrelation process, for example, using the all-pass filters that are dependent on the effective distance between the two farthest loudspeakers. For directional audio signal, the processing purpose is to maintain the trajectory and timbre of objects. This can be done through the HRTF (Head Related Transfer Function) of the object direction and physical loudspeaker location as in the traditional speaker virtualizer.

In some example embodiments, the method 100 may further include a metadata preprocess module when the input audio streams contain metadata. For example, object audio signals usually carry metadata, which may include, for example information about channel level difference, time difference, room characteristics, object trajectory, and the like. This information can be preprocessed via the optimization for the specific loudspeaker layout. Preferably, the translation can be represented as a function of rotation angles. In the real-time processing, metadata can be loaded and smoothed corresponding to the current angle.

The method 100 may also include a crosstalk cancelling process according to some example embodiments. For example, when playing binaural signals through loudspeakers, it is possible to utilize an inverse filter to cancel the crosstalk component.

Figure 4:
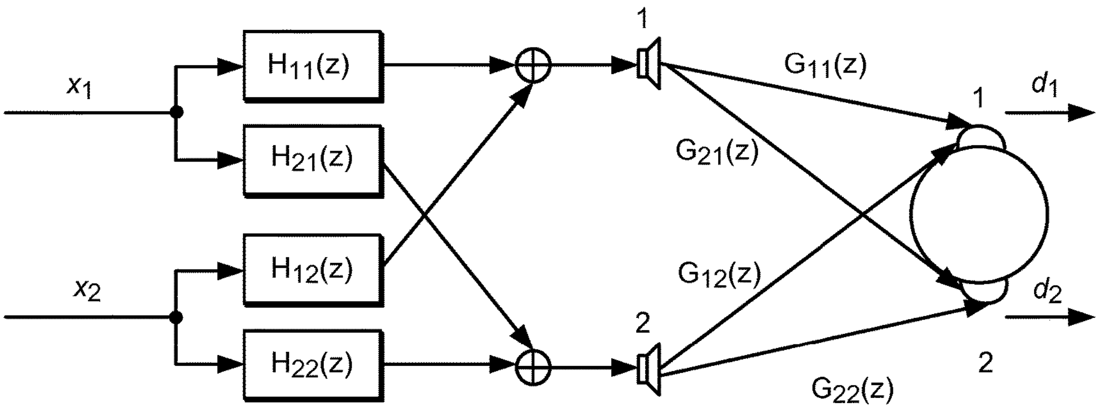
FIG. 4 illustrates a block diagram of the crosstalk cancellation system for stereo loudspeakers.

By way of example, FIG. 4 illustrates a block diagram of the crosstalk cancellation system for stereo loudspeakers. The input binaural signals from left and right channels are given in vector form $x(z)=[x_1(z), x_2(z)]^T$, and the signals received by two ears are denoted as $d(z)=[d_1(z), d_2(Z)]^T$, where signals are expressed in the z domain. The objective of crosstalk cancellation is to perfectly reproduce the binaural signals at the listener's eardrums, via inverting the acoustic path G(z) with the crosstalk cancellation filter H(z). H(z) and G(z) are respectively denoted in matrix forms as:

$$G(z) = \begin{bmatrix} G_{11}(z) & G_{12}(z) \\ G_{21}(z) & G_{22}(z) \end{bmatrix}, H(z) = \begin{bmatrix} H_{11}(z) & H_{12}(z) \\ H_{21}(z) & H_{22}(z) \end{bmatrix} \quad (11)$$

where $G_{i,j}(z)$, i,j=1,2 represents the transfer function from the jth loudspeaker to the I car, and $H_{i,j}(z)$, i,j=1,2 represents the crosstalk cancellation filter from $x_j$ to the ith loudspeaker.

Normally, the crosstalk canceller H(z) can be calculated as the product of the inverse of the transfer function G(z) and a delay term d. By way of example, in one embodiment, the crosstalk canceller H(z) can be obtained as follows:

$$H(z)=z^{-d}G^{-1}(z) \quad (12)$$

where H(z) represents the crosstalk canceller, G(z) represents the transfer function and d represents a delay term.

Figure 5:
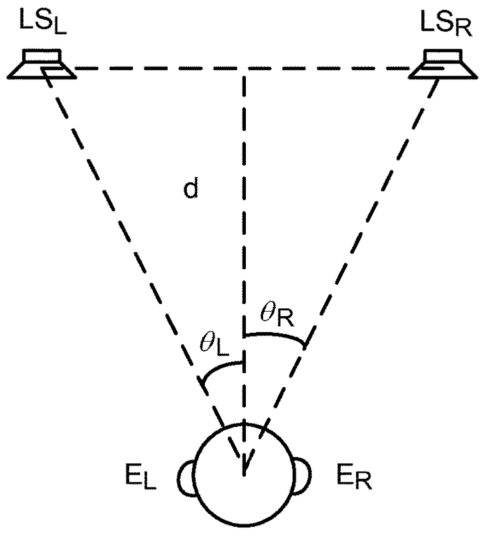
FIG. 5 shows the angles between human head and the loudspeakers.

As shown in FIG. 5, when the distance d between the loudspeakers (such as, $LS_L$ and $LS_R$) of one electronic device changes, the angles $\theta^L$ and $\theta_R$ will be different, which lead to different acoustic transfer functions G(z). Accordingly, this leads to a different crosstalk canceller H(z).

In one example embodiment, assuming that an HRTF contains a resonance system of ear canal whose resonance frequencies and Q factors are independent of source directions, the crosstalk canceller can be decomposed into orientation variant and invariant components. Specifically, an HRTF can be modeled by using poles that are independent of source directions and zeros that are dependent on source directions. By way of example, a model called common-acoustical pole/zero model (CAPZ) has been proposed for stereo crosstalk cancellation and can be used in connection with embodiments of the present invention (as recited in "A Stereo Crosstalk Cancellation System Based on the Common-Acoustical Pole/Zero Model", Lin Wang, Fuliang Yin and Zhe Chen, EURASIP Journal on Advances in Signal Processing 2010, 2010:719197), the contents of which are incorporated herein by reference in its entirety. For example, according to the CAPZ, each transfer function can be modeled by a common set of poles and a unique set of zeros, as follows:

$$\hat{G}_i(z) = \frac{B_i(z)}{A(z)} = \frac{\sum_{n=0}^{N_q} b_{n,i} z^{-n}}{1 + \sum_{n=1}^{N_p} a_n z^{-n}} \quad (13)$$

where $\hat{G}_i(z)$ (i=1, . . . , K) represents the transfer function, $N_q$ and $N_p$ represent the numbers of the poles and zeros, and $a=[1, a_1, \ldots a_{N_p}]^T$ and $b_i=[b_{1,i}, \ldots b_{N_q,i}]^T$ represent the pole and zero coefficient vectors, respectively.

The pole and zero coefficients are estimated by minimizing the total modeling error for all K transfer functions. For each crosstalk cancellation function, H(z) can be obtained as follows:

$$H(z) = \frac{z^{-(d-d_{11}-d_{22})}}{B_{11}(z)B_{22}(z) - B_{12}(z)B_{21}(z)z^{-\Delta}} \times \begin{bmatrix} B_{22}(z)A(z)z^{-d_{22}} & B_{12}(z)A(z)z^{-d_{12}} \\ B_{21}(z)A(z)z^{-d_{21}} & B_{22}(z)A(z)z^{d_{11}} \end{bmatrix} = C(z)\begin{bmatrix} B_{22}(z)A(z)z^{-d_{22}} & B_{12}(z)A(z)z^{-d_{12}} \\ -B_{21}(z)A(z)z^{-d_{21}} & B_{11}(z)A(z)z^{d_{11}} \end{bmatrix} \quad (14)$$

where $G_{11}(z)=[B_{11}(z)/A(z)]\cdot z^{-d_{11}}$, $G_{12}(z)=[B_{12}(z)/A(z)]\cdot z^{-d_{12}}$, $G_{21}(z)=[B_{21}(z)/A(z)]\cdot z^{-d_{21}}$, $G_{22}(z)=[B_{22}(z)/A(z)]\cdot z^{-d_{22}}$, $d_{11}$, $d_{12}$, $d_{21}$ and $d_{22}$ represent the transmission delays from the loudspeakers to the ears, and $\delta=d-(d_{11}+d_{22})$ represents the delay.

In one embodiment, the crosstalk cancellation function can be separated into an orientation dependent (zeros)

$$\begin{pmatrix} C(z)B_{22}z^{-d_{22}} & -C(z)B_{12}z^{-d_{12}} \\ -C(z)B_{21}z^{-d_{21}} & C(z)B_{22}z^{-d_{11}} \end{pmatrix}$$

and independent components $$(\text{poles})\begin{pmatrix} A(z) & 0 \\ 0 & A(z) \end{pmatrix}.$$

And the total processing matrix is $$\begin{pmatrix} C(z)B_{22}z^{-d_{22}} & -C(z)B_{12}z^{-d_{12}} \\ -C(z)B_{21}z^{-d_{21}} & C(z)B_{22}z^{-d_{11}} \end{pmatrix}\begin{pmatrix} A(z) & 0 \\ 0 & A(z) \end{pmatrix} \quad (15)$$

Two-Channel

The input audio streams can be in a different format. In some embodiment, the input audio streams are two-channel input audio signals, for example, the left and right channels. In this case, equation (1) can be written as:

$$\begin{pmatrix} Spkr_1 \\ Spkr_2 \\ \vdots \\ Spkr_S \end{pmatrix} = \begin{pmatrix} r_{1,1} & r_{1,2} \\ r_{2,1} & r_{2,2} \\ \vdots & \vdots \\ r_{S,1} & r_{S,2} \end{pmatrix} \times \begin{pmatrix} L \\ R \end{pmatrix} \quad (16)$$

where L represents the left channel input signal, and R represents the right channel input signal. The signal can be converted to the mid-side format for the ease of processing, for example, as follows:

$$\begin{pmatrix} \text{Mid} \\ \text{Side} \end{pmatrix} = \begin{pmatrix} 0.5 & 0.5 \\ 0.5 & -0.5 \end{pmatrix} \times \begin{pmatrix} L \\ R \end{pmatrix} \quad (17)$$

where Mid=½*(L+R), and Side=½*(L−R).

In one embodiment, the simplest processing would be selecting a pair of speakers appropriate for outputting the signals according to the current device orientation, while muting all the other speakers. For example, for the three-speaker case as in FIG. 2, when the electronic device is in landscape mode initially, the equation (1) can be written as follows:

$$\begin{pmatrix} Spkr_a \\ Spkr_b \\ Spkr_c \end{pmatrix} = \begin{pmatrix} 1 & 1 \\ 1 & -1 \\ 0 & 0 \end{pmatrix} \times \begin{pmatrix} 0.5 & 0.5 \\ 0.5 & -0.5 \end{pmatrix} \times \begin{pmatrix} L \\ R \end{pmatrix} \quad (18)$$

It can be seen from equation (17) that the left and right channel signals are sent to loudspeakers a and b, while the loudspeaker c is untouched. After rotation, supposing that the device is in portrait mode, and the equation (1) can be rewritten as:

$$\begin{pmatrix} Spkr_a \\ Spkr_b \\ Spkr_c \end{pmatrix} = \begin{pmatrix} 0 & 0 \\ 1 & -1 \\ 1 & 1 \end{pmatrix} \times \begin{pmatrix} 0.5 & 0.5 \\ 0.5 & -0.5 \end{pmatrix} \times \begin{pmatrix} L \\ R \end{pmatrix} \quad (19)$$

It can be seen that the rendering matrix is changed, and when the device is in portrait mode, the left channel signal and the right channel signal are sent to the loudspeakers c and b, respectively, while the loudspeaker a is muted.

The aforementioned implementation is a simple way to select a different subset of loudspeakers to output L and R signals for different orientations. It can also adopt more complicated rendering components as demonstrated below. For example, for the loudspeaker layout in FIG. 2, since loudspeakers b and c are closer to each other relative to speaker a, the right channel can be dispatched evenly between b and c. Thus, in the landscape mode, the orientation dependent component can be selected as:

$$O_L = \begin{pmatrix} \frac{1}{\sqrt{2}} & \frac{1}{\sqrt{2}} \\ \frac{\sqrt{2}}{2} & -\frac{\sqrt{2}}{2} \\ \frac{\sqrt{2}}{2} & -\frac{\sqrt{2}}{2} \end{pmatrix} \quad (20)$$

When the electronic device is in the portrait mode, the orientation dependent component changes as below:

$$O_P = \begin{pmatrix} \sqrt{\frac{2}{3}} & 0 \\ \sqrt{\frac{2}{3}} & -1 \\ \sqrt{\frac{2}{3}} & 1 \end{pmatrix} \quad (21)$$

As the orientation of the electronic device changes, the orientation dependent component changes correspondingly.

$$O(\theta)=\begin{pmatrix} O_{1,1}(\theta) & O_{1,2}(\theta) \\ O_{2,1}(\theta) & O_{2,2}(\theta) \\ O_{3,1}(\theta) & O_{3,2}(\theta) \end{pmatrix} \tag{22}$$

where O(θ) represents the corresponding orientation dependent component when the angle equals to θ.

Rendering matrices can be similarly derived for other loudspeaker layout cases, such as 4-loudspeaker layout, five-loudspeaker layout, and the like. When the input signals are binaural signals, aforementioned crosstalk canceller and the Mid-Side processing can be employed simultaneously, and the orientation invariant transformation becomes:

$$\begin{pmatrix} 0.5 & 0.5 \\ 0.5 & -0.5 \end{pmatrix}\begin{pmatrix} A(z) & 0 \\ 0 & A(z) \end{pmatrix} \tag{23}$$

In that case, the orientation dependent transformation is the product of the zero components of the crosstalk canceller and the layout dependent rendering matrix.

$$\begin{pmatrix} 1 & 1 \\ 1 & -1 \\ 0 & 0 \end{pmatrix}\begin{pmatrix} C(z)B_{22}z^{-d_{22}} & -C(z)B_{12}z^{-d_{12}} \\ -C(z)B_{2'}z^{-d_{21}} & C(z)B_{22}z^{-d_{11}} \end{pmatrix} \tag{24}$$

Multi-Channel

Input signals may consist of multiple channels (N>2). For example, the input signals may be in Dolby Digital/Dolby Digital Plus 5.1 format, or MPEG surround format.

In one embodiment, the multi-channel signals may be converted into stereo or binaural signals. Then the techniques described above may be adopted to feed the signals to the loudspeakers accordingly. Converting multi-channel signals to stereo/binaural signals can be realized, for example, by proper downmixing or binaural audio processing methods depending on the specific input format. For example, Left total/Right total (Lt/Rt) is a downmix suitable for decoding with a Dolby Pro Logic decoder to obtain surround 5.1 channels.

Alternatively, multi-channel signals can be fed to loudspeakers directly or in a customized format instead of a conventional stereo format. For example, for the 4-loudspeaker layout shown in FIG. 3, the input signals can be converted into an intermediate format which contains C, Lt, and Rt as below:

$$\begin{pmatrix} C \\ L_t \\ R_t \end{pmatrix}=\begin{pmatrix} 1 & 0 & 0 & 0 & 0 \\ 0.5 & 1 & 0 & -0.5 & -0.5 \\ 0.5 & 0 & 0 & 0.5 & 0.5 \end{pmatrix}\begin{pmatrix} C \\ L \\ R \\ L_s \\ R_s \end{pmatrix} \tag{25}$$

where $(C\ L\ R\ L_s\ R_s)^T$ represents the input signals.

For landscape mode, when the Lt and Rt channel signals are sent to the loudspeakers a and c shown in FIG. 3, and the C signal is split evenly to loudspeakers b and d, the orientation dependent component is as below:

$$O_L=\begin{pmatrix} 0 & 1 & 0 \\ 0.5 & 0 & 0 \\ 0 & 0 & 1 \\ 0.5 & 0 & 0 \end{pmatrix} \tag{26}$$

Alternatively, the inputs can be directly processed by the orientation dependent matrix, such that each individual channel can be adapted separately according to the orientation. For example, more or less gains can be applied to the surround channels according to the loudspeaker layout.

$$O_L=\begin{pmatrix} 0 & 1 & 0 & 1 & 0 \\ 0.5 & 0 & 0 & 0 & 0 \\ 0 & 0 & 1 & 0 & 1 \\ 0.5 & 0 & 0 & 0 & 0 \end{pmatrix} \tag{27}$$

Multi-channel input may contain height channels, or audio objects with height/elevation information. Audio objects, such as rain or air planes, may also be extracted from conventional surround 5.1 audio signals. For example, inputs signals may contain the conventional surround 5.1 plus 2 height channels, denoted as surround 5.1.2.

Object Audio Format

Recent audio developments introduce a new audio format that includes both audio channels (beds) and audio objects to create a more immersive audio experience. Herein, channel-based audio means the audio content that usually has a predefined physical location (usually corresponding to the physical location of the loudspeakers). For example, stereo, surround 5.1, surround 7.1, and the like can be all categorized to the channel-based audio format. Different from the channel-based audio format, object-based audio refers to an individual audio element that exists for a defined duration of time in the sound field whose trajectory can be static or dynamic. This means when an audio object is stored in a mono audio signal format, it will be rendered by the available loudspeaker array according to the trajectory stored and transmitted as metadata. Thus, it can be concluded that sound scene preserved in the object-based audio format consists of a static portion stored in the channels and a dynamic portion stored in the objects with their corresponding metadata indication of the trajectories.

Hence, in the context of the object-based audio format, two rendering matrices are needed for the objects and the channels, which are formed by their corresponding orientation dependent and orientation independent components. Thus, equation (1) becomes $$\mathrm{Spkr}=R^{obj}\times\mathrm{Obj}+R^{chn}\times\mathrm{Chn}=O^{obj}\times P^{obj}\times\mathrm{Obj}+O^{chn}\times P^{chn}\times\mathrm{Chn} \tag{28}$$

where $O^{obj}$ represents the orientation dependent component of the object rendering matrix $R^{obj}$, $P^{obj}$ represents the orientation independent component of the object rendering matrix $R^{obj}$, $O^{chn}$ represents the orientation dependent component of the channel rendering matrix $R^{chn}$, and $P^{chn}$ represents the orientation independent component of the channel rendering matrix $R^{chn}$.

Ambisonics B-Format

The receiving audio streams can be in Ambisonics B-format. The first order B-format without elevation Z channel is commonly referred to as WXY format.

For example, the sound referred to as $Sig_1$ is processed to produce three signals $W_1$, $X_1$ and $Y_1$ by the following linear mixing process:

$$W_1 = Sig_1$$

$$X_1 = x \times Sig_1$$

$$Y_1 = y \times Sig_1 \tag{29}$$

where x represents cos(θ), y represents sin(θ), and θ represents the direction of the $Sig_1$.

B-format is a flexible intermediate audio format, which can be converted to various audio formats suitable for the loudspeaker playback. For example, there are existing ambisonic decoders that can be used to convert B-format signals to binaural signals. Cross-talk cancellation is further applied to stereo loudspeaker playback. Once the input signals are converted to binaural or multi-channel formats, previously proposed rendering methods can be employed to playback audio signals.

When B-format is used in the context of voice communication, it is used to reconstruct the sender's full or partial soundfield on the receiving device. For example, various methods are known to render WXY signals, in particular the first-order horizontal soundfield. With added spatial cues, spatial audio such as WXY improves users' voice communication experience.

In some known solutions, voice communication device is assumed to have a horizontal loudspeaker array (as described in WO2013142657 A1, the contents of which are incorporated herein by reference in its entirety), which is different from the embodiments of the present invention where the loudspeaker array is positioned vertically, for example, when the user is making a video voice call using the device. Without changing the rendering algorithm, this would result in a top view of the soundfield for the end user. While this may lead to a somewhat unconventional soundfield perception, the spatial separation of talkers in the soundfield is well preserved and the separation effect may be even more pronounced.

In this rendering mode, the sound field may be rotated accordingly when the orientation of the device is changed, for example, as follows:

$$\begin{bmatrix} W' \\ X' \\ Y' \end{bmatrix} = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} W \\ X \\ Y \end{bmatrix} \tag{30}$$

where θ represents the rotation angle. The rotation matrix constitutes the orientation dependent component in this context.

Figure 6:
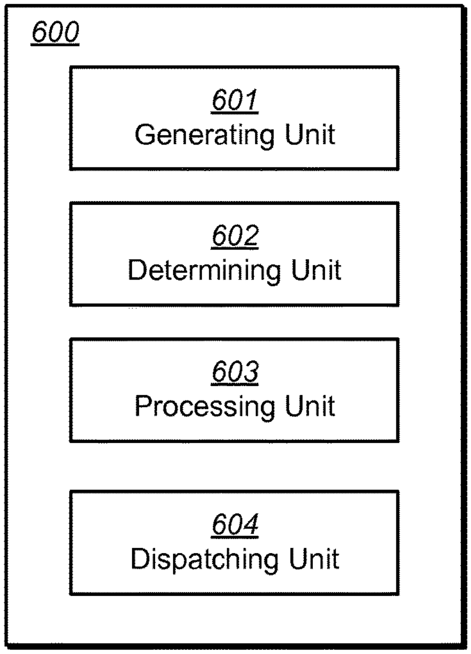
FIG. 6 illustrates a block diagram of a system for processing audio on an electronic device that includes a plurality of loudspeakers in accordance with example embodiments disclosed herein.

FIG. 6 illustrates a block diagram of a system 600 for processing audio on an electronic device that includes a plurality of loudspeakers arranged in more than one dimension of the electronic device according to an example embodiment.

The generator (or generating unit) 601 may be configured to generate a rendering component associated with a plurality of received audio streams, responsive to the plurality of received audio streams. The rendering components are associated with the input signal properties and playback requirements. In some embodiments, the rendering component is associated with the content or the format of the received audio streams.

The determiner (or determining unit) 602 is configured to determine an orientation dependent component of the rendering component. In some embodiments, the determiner 402 can further be configured to split the rendering component into orientation dependent component and orientation independent component.

The processor 603 is configured to process the rendering component by updating the orientation dependent component according to an orientation of the loudspeakers. The number of the loudspeakers and the layout of the loudspeakers can vary according to different applications. The orientation can be determined, for example, by using orientation sensors or other suitable modules, such as gyroscope and accelerometer or the like. The orientation determining modules may, for example be disposed inside or external to the electronic device. The orientation of the loudspeakers is associated with an angle between the electronic device and the vertical direction continuously.

The dispatcher (or dispatching unit) 604 is configured to dispatch the received audio streams to the plurality of loudspeakers for playback based on the processed rendering component.

It should be noted that some optional components may be added to the system 600, and one or more blocks of the system shown in the FIG. 6 may be omitted. The scope of the present invention is not limited in this regard.

In some embodiments, the system 600 further includes an upmixing or a downmixing unit configured to upmix or downmix the received audio streams depending on the number of the loudspeakers. Furthermore, in some embodiments, the system can further comprise a crosstalk canceller configured to cancel crosstalk of the received audio streams.

In other embodiments, the determiner 602 is further configured to split the rendering component into orientation dependent component and orientation independent component.

In some embodiments, the received audio streams are binaural signals. Furthermore, the system further comprises a converting unit configured to convert the received audio streams into mid-side format when the received audio streams are binaural signals.

In some embodiments, the received audio streams are in object audio format. In this case, the system 600 can further include a metadata processing unit configured to process the metadata carried by the received audio streams.

Figure 7:
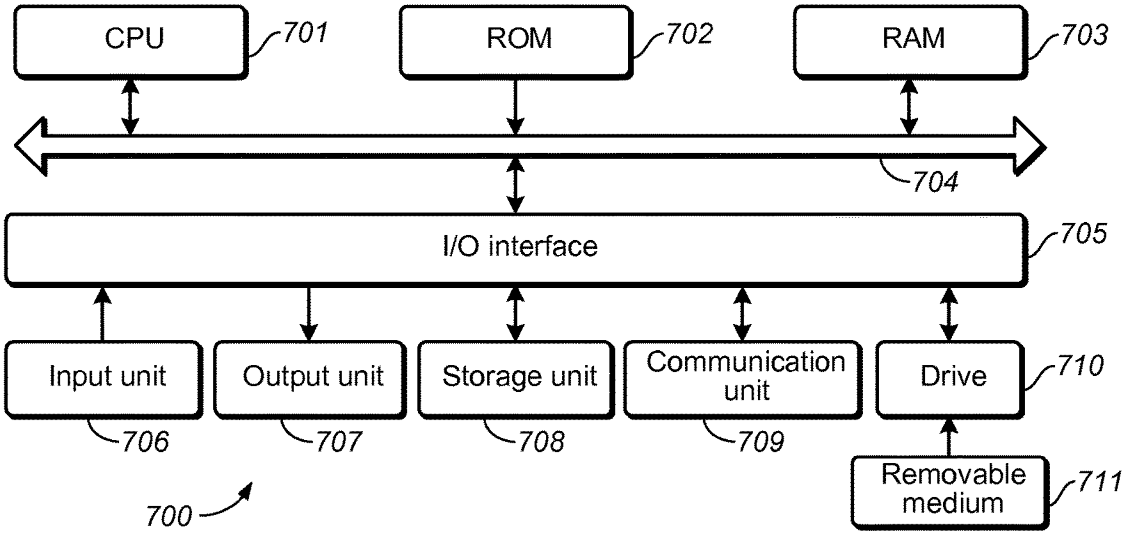
FIG. 7 illustrates a block diagram of an example computer system suitable for implementing example embodiments disclosed herein.

FIG. 7 shows a block diagram of an example computer system 700 suitable for implementing embodiments disclosed herein. As shown, the computer system 700 comprises a central processing unit (CPU) 701 which is capable of performing various processes in accordance with a program stored in a read only memory (ROM) 702 or a program loaded from a storage section 708 to a random access memory (RAM) 703. In the RAM 703, data required when the CPU 701 performs the various processes or the like is also stored as required. The CPU 701, the ROM 702 and the RAM 703 are connected to one another via a bus 704. An input/output (I/O) interface 705 is also connected to the bus 704.

The following components are connected to the I/O interface 705: an input section 706 including a keyboard, a mouse, or the like; an output section 707 including a display such as a cathode ray tube (CRT), a liquid crystal display (LCD), or the like, and a loudspeaker or the like; the storage section 708 including a hard disk or the like; and a communication section 709 including a network interface card such as a LAN card, a modem, or the like. The communication section 709 performs a communication process via the network such as the internet. A drive 710 is also connected to the I/O interface 705 as required. A removable medium 711, such as a magnetic disk, an optical disk, a magneto-optical disk, a semiconductor memory, or the like, is mounted on the drive 710 as required, so that a computer program read therefrom is installed into the storage section 708 as required.

Specifically, in accordance with embodiments of the present invention, the processes described above with reference to FIGS. 1-6 may be implemented as computer software programs. For example, example embodiments disclosed herein may include a computer program product including a computer program tangibly embodied on a machine readable medium, the computer program including program code for performing methods 100 and/or 700. In such embodiments, the computer program may be downloaded and mounted from the network via the communication section 709, and/or installed from the removable medium 711.

Generally speaking, various example embodiments may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present invention include a computer program product comprising a computer program tangibly embodied on a machine readable medium, and the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the example embodiments may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any embodiment or of what may be claimed, but rather as descriptions of features that may be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications and adaptations made to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments set forth herein will come to mind to one skilled in the art, to which these embodiments of the invention pertain having the benefit of the teachings presented in the foregoing descriptions and the drawings.

Accordingly, the example embodiments may be embodied in any of the forms described herein. For example, the following enumerated example embodiments (EEEs) describe some structures, features, and functionalities of some aspects of the example embodiments.

EEE 1. A method of outputting audio on a portable device, comprising:

receiving a plurality of audio streams;

detecting the orientation of the loudspeaker array consisting of at least three loudspeakers arranged in more than one dimension;

generating a rendering component according to the input audio format;

splitting the rendering component into orientation dependent and independent components;

updating the orientation dependent component according to the detected orientation; and outputting, by at least three speakers arranged in more than one dimension, the plurality of audio streams having been processed.

EEE 2. The method according to EEE 1, wherein the loudspeaker orientation is detected by orientation sensors.

EEE 3. The method according to EEE 2, wherein the rendering component contains a crosstalk cancellation module.

EEE 4. The method according to EEE 3, wherein the rendering component contains an upmixer.

EEE 5. The method according to EEE 2, wherein the plurality of audio streams are in WXY format.

EEE 6. The method according to EEE 2, wherein the plurality of audio streams are in 5.1 format.

EEE 7. The method according to EEE 6, wherein the plurality of audio streams are in stereo format.

It will be appreciated that the embodiments are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for processing audio on an electronic device comprising a plurality of loudspeakers, the loudspeakers arranged in more than one dimension of the electronic device, comprising:

responsive to receipt of a plurality of received audio streams, generating a rendering component associated with the plurality of received audio streams;

determining an orientation dependent component of the rendering component;

processing the rendering component by updating the orientation dependent component according to an orientation of the loudspeakers;

cancelling crosstalk of the received audio streams;

separating a crosstalk cancellation function into an orientation dependent component and an orientation independent component; and dispatching the received audio streams to the plurality of loudspeakers for playback based on the processed rendering component, wherein the method further comprises decomposing the received audio streams to direct and diffuse parts; and in determining the orientation dependent component of the rendering component, different orientation dependent components are used for the direct and diffuse parts, respectively.

2. The method according to claim 1, further comprising upmixing or downmixing the received audio streams depending on the number of the loudspeakers.

3. The method according to claim 1, wherein determining an orientation dependent component of the rendering component comprises:

splitting the rendering component into orientation dependent component and orientation independent component.

4. The method according to claim 1, the orientation of the loudspeakers is associated with an angle between the electronic device and its user continuously.

5. The method according to claim 1, wherein the rendering component is associated with the content or the format of the received audio streams.

6. The method according to claim 1, wherein the plurality of received audio streams are two channel signals, multi-channel signals, object audio format signals or Ambisonics B-format signals.

7. The method according to claim 6, the method further comprising converting the plurality of received audio streams into mid-side format when the plurality of received audio streams are two channel signals.

8. The method according to claim 6, further comprising processing metadata carried by the received audio streams.

9. A system for processing audio on an electronic device comprising a plurality of loudspeakers, the loudspeakers arranged in more than one dimension of the electronic device, comprising:

a generator that generate a rendering component associated with a plurality of received audio streams, responsive to receipt of the plurality of received audio streams;

a determiner that determine an orientation dependent component of the rendering component;

a processor that process the rendering component by updating the orientation dependent component according to an orientation of the loudspeakers;

a crosstalk canceller configured to cancel crosstalk of the received audio streams, and to separate a crosstalk cancellation function into an orientation dependent component and an orientation independent component; and a dispatcher that dispatch the received audio streams to the plurality of loudspeakers for playback based on the processed rendering component, wherein the system further comprises a decomposer that decompose the received audio streams to direct and diffuse parts, and further wherein the determiner uses different orientation dependent components for the direct and diffuse parts, respectively.

10. The system according to claim 9, further comprising an upmixer or a downmixer that upmix or downmix the received audio streams depending on the number of the loudspeakers.

11. The system according to claim 9, wherein the determiner is further configured to split the rendering component into orientation dependent component and orientation independent component.

12. The system according to claim 9, wherein the orientation of the loudspeakers is associated with an angle between the electronic device and its user.

13. The system according to claim 9, wherein the rendering component is associated with the content or the format of the received audio streams.

14. The system according to claim 9, wherein the received audio streams are two channel signals, multi-channel signals, object audio format signals or Ambisonics B-format signals.

15. The system according to claim 14, the system further comprising a converter that convert the received audio streams into mid-side format when the plurality of received audio streams are two channel signals.

16. The system according to claim 14, further comprising a metadata processer configured to process metadata carried by the received audio streams.

17. A computer program product, comprising a computer program tangibly embodied on a non-transitory machine readable medium, the computer program containing program code for performing the method according to claim 1.

* * * * *